Dec. 7, 1937.  H. VOIGTLÄNDER  2,101,376
PERCUSSIVE BORING TOOL
Filed Sept. 25, 1935

Inventor:
HERMANN VOIGTLANDER
By Emil Bönnelycke
ATTORNEY

Patented Dec. 7, 1937

2,101,376

UNITED STATES PATENT OFFICE 2,101,376

PERCUSSIVE BORING TOOL

Hermann Voigtländer, Essen, Germany, assignor to N. V. Wallramit Handel Maatschappij, Rotterdam, Netherlands Application September 25, 1935, Serial No. 42,130
In Germany October 9, 1934

6 Claims. (Cl. 255—63)

Percussive stone-boring tools provided with a hard metal inset are in general made by the small plate of hard metal being embedded in a steel shaft and soldered thereto. These known tools have the disadvantage that the pieces of hard metal are broken up after comparatively short use since in consequence of the embedding of the hard metal cutting edge in the shaft, there is created a rigid and inelastic connection between the steel of the shaft and the hard metal. Now, whilst the hard metal is very hard, it is also very brittle. Since on striking it, in consequence of the rigid connection with the shaft, a yielding of the latter is impossible, the friability of the hard metal has led to its rapid destruction.

The present invention has for its object to obviate this drawback. To this end the hard metal cutter is so embedded in the shaft of the tool, which itself may consist of steel hardened as much as possible, that an elastic yielding is possible. Preferably, the part of the cutter fitted in the shaft is tapered towards the latter and cemented or soldered in position so that slight yielding may take place at the base of the cutter. With this arrangement, the cutter will, when the blow is struck, slightly spread out the parts of the shaft bearing on it by a wedge action, and there follows a flexible recoil. The space at the base of the cutter can also be filled with an elastic layer. For example, a thick soldered joint may be arranged at this point or a metal inlay of a more elastic metal may be provided.

Figures 1, 2:
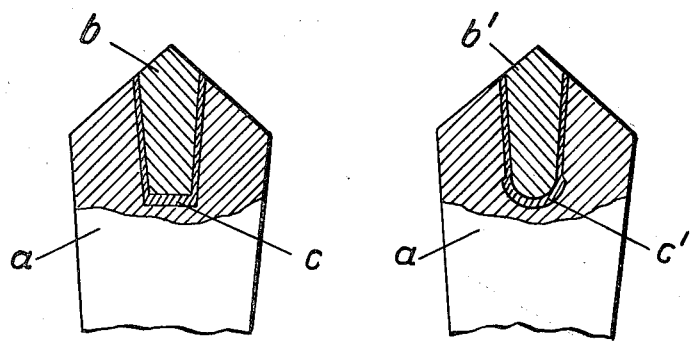
Figure 3:
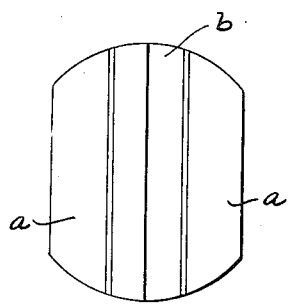

The accompanying drawing shows in Figures 1 and 2, side views partly in section of two embodiments of the invention and Fig. 3 is an end view of Figs. 1 and 2.

In the figures, $a$ is the shaft of the tool, namely, of a percussive stone borer, which consists of self-hardening steel as highly alloyed as possible. In this shaft is made a tapered slot in which is inserted a hard metal inset $b$ or $b'$; the latter being preferably soldered to the shaft. In order that, on the blow, the inset can yield slightly inward, there is provided at the foot, a hollow space $c$ or $c'$ which can be filled up with the solder. There is thus formed what may be described as a thick joint of solder indicated by $c$ and $c'$, but there can also be inserted at this point a metal inlay of an elastic metal, and the whole be soldered together. The embodiments according to Figures 1 and 2 differ simply in that the cutter $b'$ is rounded at the foot and consequently the intermediate layer $c'$ is also rounded, whilst the foot of the cutter $b$ is made flat. Fig. 3 shows the boring end of the tool.

I claim:—

1. A percussive stone-boring tool consisting of a tool shaft having a recess at the boring end thereof with side faces tapering away from each other toward the boring end of the tool, a hard metal wedge-shaped inset in the recess having a cutting edge and side faces tapered to correspond to the tapered faces of the shaft, and a soft and elastic support between the tapered side faces and the inner end of the inset and the bottom of the recess, said support forming a solid welded or soldered metallic connection between the tool shaft and the inset and the side support being thinner than the bottom support.

2. A percussive stone-boring tool according to claim 1, in which the shaft is composed of hardened steel.

3. A percussive stone-boring tool according to claim 1, in which the support is composed of a comparatively thick layer of solder.

4. A percussive stone-boring tool according to claim 1, in which the support is composed of an intermediate layer of more elastic metal.

5. A percussive stone-boring tool according to claim 1, in which the bottom of the recess and the inner end of the inset are plane surfaces.

6. A percussive stone-boring tool according to claim 1, in which the bottom end of the recess and the inner end of the inset are concavo-convex surfaces.

HERMANN VOIGTLÄNDER.